J. E. WEBSTER & F. DUFF.
COIL SHIELD FOR DYNAMO ELECTRIC MACHINES.
APPLICATION FILED APR. 28, 1906.
956,553.
Patented May 3, 1910.
2 SHEETS—SHEET 1.
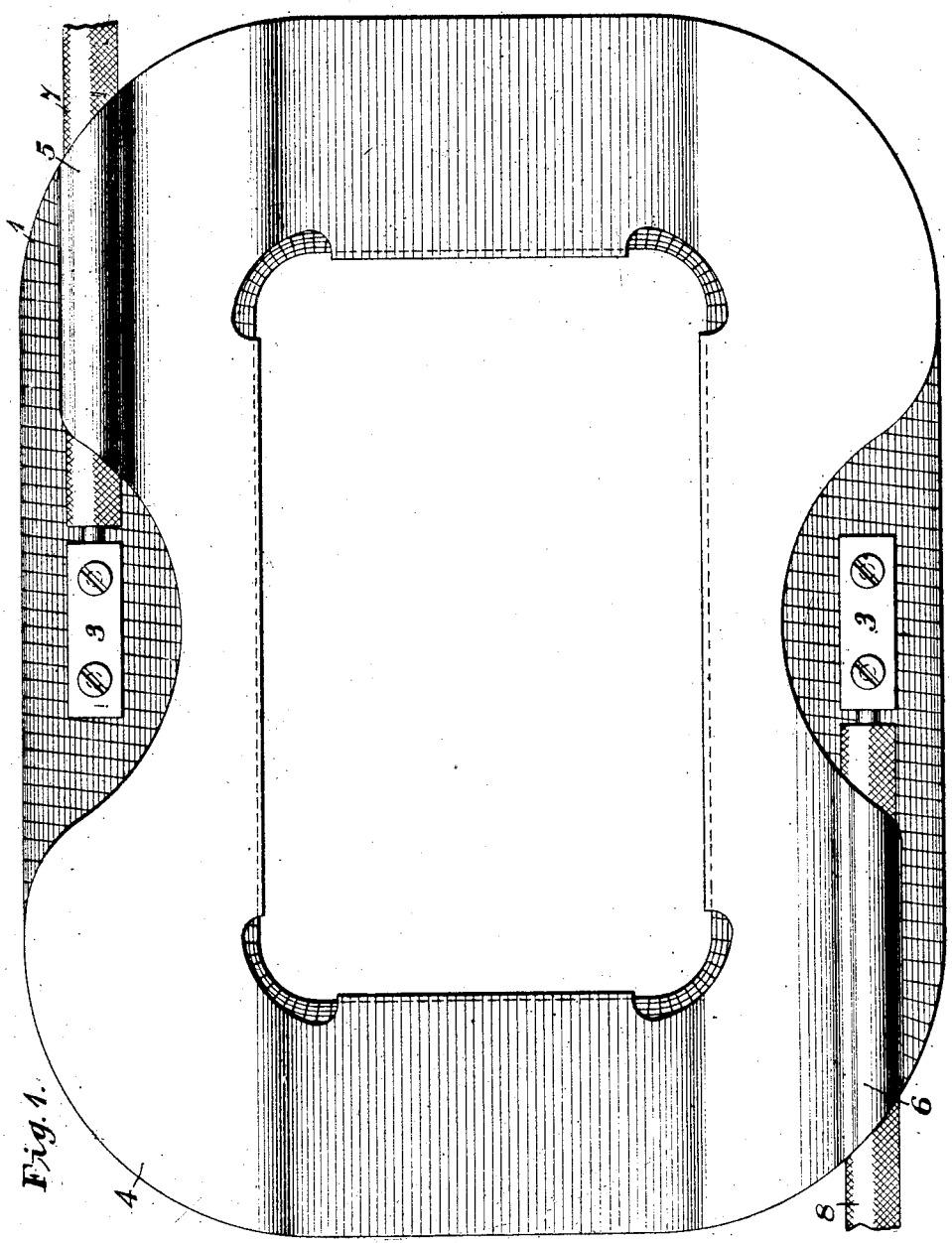

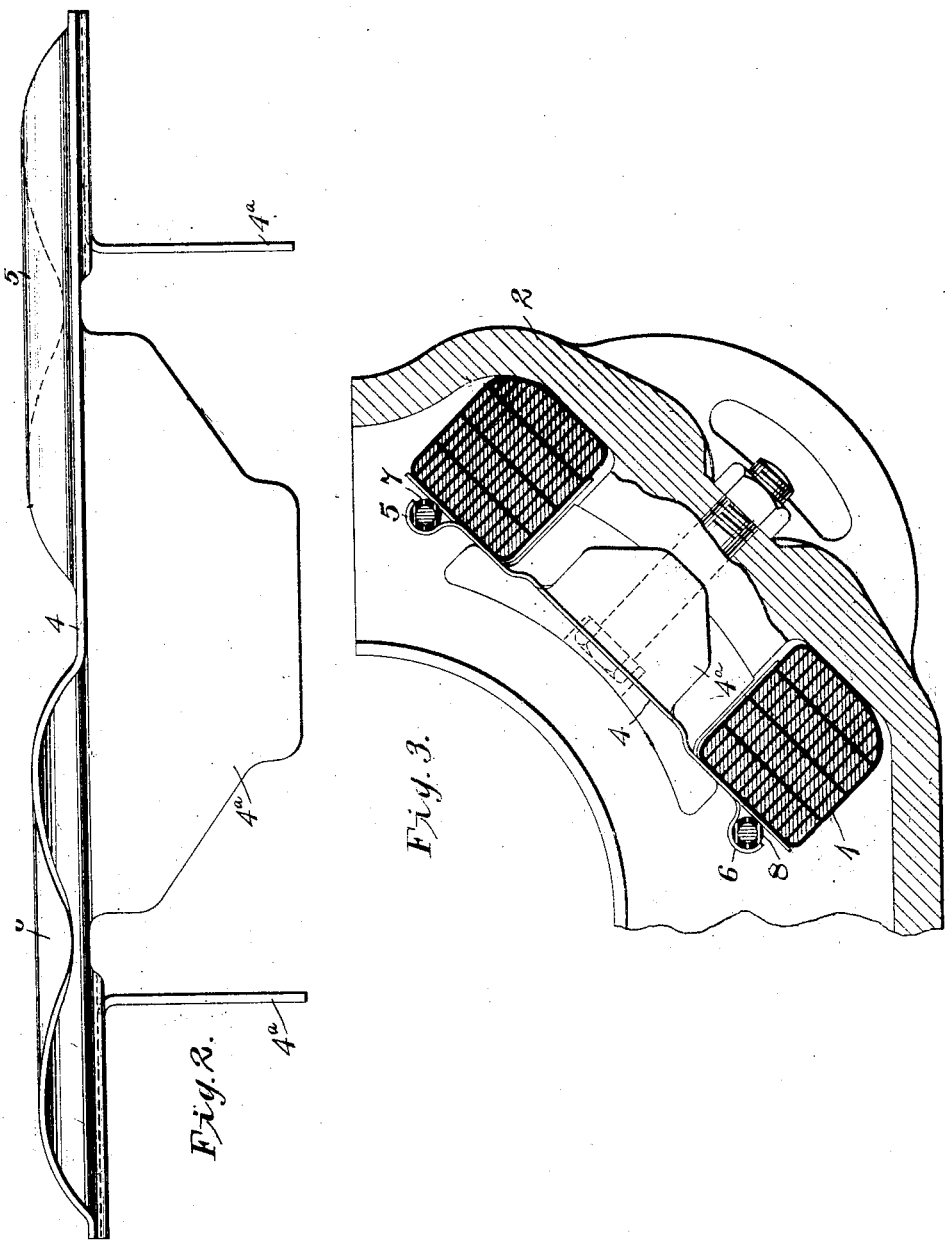

UNITED STATES PATENT OFFICE.

JOHN E. WEBSTER, OF PITTSBURG, AND FRANK DUFF, OF ALLEGHENY, PENNSYLVANIA, ASSIGNORS TO WESTINGHOUSE ELECTRIC & MANUFACTURING COMPANY, A CORPORATION OF PENNSYLVANIA.

COIL-SHIELD FOR DYNAMO-ELECTRIC MACHINES.

956,553.    Specification of Letters Patent.    Patented May 3, 1910.

Application filed April 28, 1906. Serial No. 314,209.

*To all whom it may concern:*

Be it known that we, JOHN E. WEBSTER and FRANK DUFF, citizens of the United States, and residents, respectively, of Pittsburg and of Allegheny, in the county of Allegheny and State of Pennsylvania, have invented certain new and useful Improvements in Coil-Shields for Dynamo-Electric Machines, of which the following is a specification.

Our invention relates to shields or protective means for the coils of dynamo-electric machines and it has for its object to provide a shield of the aforesaid class that shall be simple and durable in construction and that shall be specially adapted to protect field magnet coils of railway motors or similar machines and the conducting leads attached thereto.

Shields or guards have usually been placed over the field magnet coils of railway motors in order to protect them from mechanical injury and have been held in position by suitable flanges on the pole tips. The pole tips are generally laminated and are bolted onto inwardly projecting pole pieces after the field magnet coils and their shields are placed in position, the flanges on the pole tips serving the double purpose of distributing the flux and supporting the field coils. A portion of each coil shield was cut away at each side to avoid screw terminals which were attached to the opposite extremities of the coils and which were adapted to receive connecting cables or other suitable leads. There has been a tendency, by reason of the vibration to which railway motors are subjected, for the conductors of which the leads were comprised, to break at the points where the leads left the screw terminals.

In order to avoid this tendency, and to suitably protect the field magnet coil, we provide a corrugation in the coil shield which is adapted to fit over the portion of the lead which is adjacent to the screw terminal.

In the accompanying drawings, Figure 1 is a plan view, Fig. 2 a side elevation and Fig. 3 an end elevation, partially in cross-section, of a field magnet coil for a dynamo-electric machine which is provided with the shield of our invention.

Referring to the drawings, a coil 1 for a field magnet frame 2 of a dynamo-electric machine, having screw terminals 3, is provided with a shield or guard 4. The shield 4 comprises a thin plate of suitable material, such as sheet steel, having inwardly projecting flanges 4ª which are formed by cutting substantially diagonal lines through its center and bending down the four sides at right angles to the plate. These projections are adapted to fit into the opening in the field magnet coil and serve to hold the shield in position. A portion of the shield is cut away at each side to avoid the screw terminals 3 and opposite corners 5 and 6 of the shield are bent into the form of a sleeve segment or corrugation to protect the conductor leads 7 and 8 which are attached to the screw terminals.

Our invention is not restricted to the type of coil or form of shield shown and we desire that it shall be construed to cover variations in size and arrangement which effect similar results.

We claim as our invention:

1. A shield for a dynamo-electric machine coil and its leads, said shield having diagonally opposite edge portions bent partially around the coil leads to protect them from injury.

2. A projecting shield for a field magnet coil and leads of a dynamo-electric machine, said shield having edge portions bent partially around the coil leads.

3. A shield for a field magnet coil of a dynamo-electric machine comprising a plate adapted to fit over the coil and cut away at its sides to avoid the coil terminals and having means for protecting and supporting the conductor leads adjacent to said terminals.

4. A shield or guard for a field magnet coil of a dynamo-electric machine comprising a plate cut away at opposite sides to avoid the coil terminals and having projections adapted to engage the inner surfaces of the coil, and a curved edge portion adjacent to each terminal to receive the corresponding conductor lead.

5. A shield or guard for a field magnet coil of a dynamo-electric machine comprising a plate cut away at opposite sides to avoid the coil terminals and having projections adapted to engage the inner surfaces of the coil, and edge portions adapted to partially surround the conductor leads to protect them from vibratory strains.

In testimony whereof, we have hereunto subscribed our names this 21st day of April, 1906.

JOHN E. WEBSTER.
FRANK DUFF.

Witnesses:
HENRY W. DRIEVER,
BIRNEY HINES.